Sept. 4, 1951  G. C. HESSNEY ET AL  2,566,328
TIRE CONSTRUCTION
Filed May 20, 1947
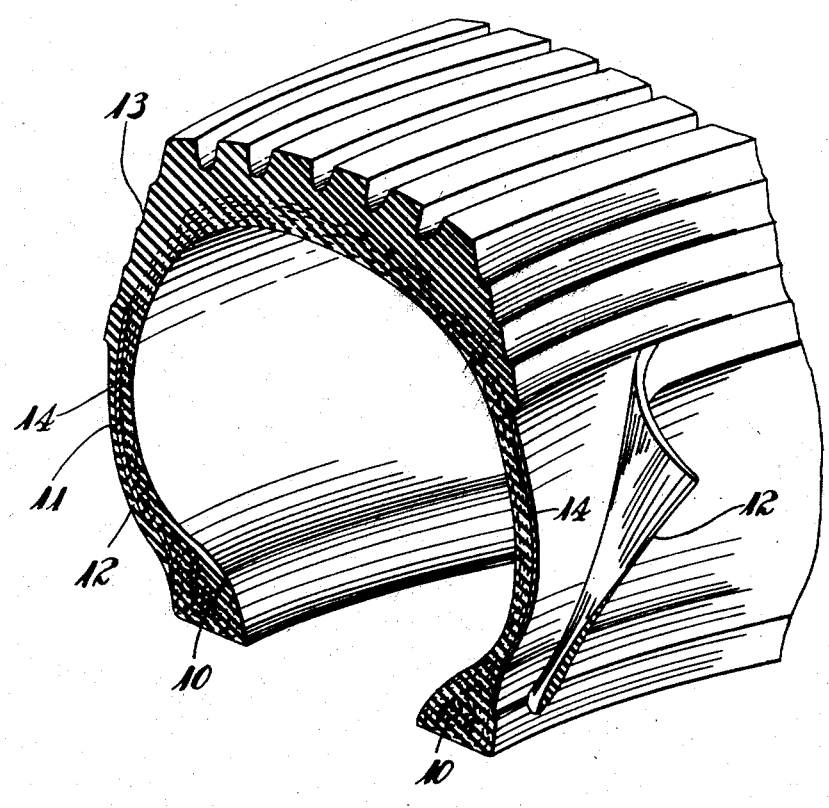
Inventors
George C. Hessney
John W. Martindale
By Robert W. Furlong
Atty.

Patented Sept. 4, 1951

2,566,328

UNITED STATES PATENT OFFICE 2,566,328

TIRE CONSTRUCTION

George C. Hessney and John W. Martindale, Akron, Ohio, assignors to The B. F. Goodrich Company, New York, N. Y., a corporation of New York Application May 20, 1947, Serial No. 749,126

15 Claims. (Cl. 152—330)

This invention relates to laminated articles containing migratory staining material and having a buffer layer between the laminations to prevent migration of the staining material from one layer to another. The invention is particularly concerned with an article such as a so-called white sidewall tire or similar light-colored article including a white or other light-colored portion in close proximity to other portions which normally or desirably contain migratory materials which would stain, discolor or otherwise deleteriously affect the light-colored portion.

The manufacture of rubber articles having a light-colored portion in combination with a portion containing migratory staining materials has heretofore entailed considerable difficulty. Most vulcanized rubbers such as natural rubber, rubbery copolymers of butadiene and styrene or of butadiene and acrylonitrile and similar rubbers are pervious to migratory staining materials which are frequently and desirably employed in rubber compositions and the light-colored compositions are badly discolored by prolonged contact with compositions containing staining material due to migration of the material from one layer to the other. The staining is especially serious upon prolonged exposure of the light-colored portion to sunlight such as is encountered by use of a white sidewall tire in regular service on an automobile.

For example, white rubber compositions are stained by almost all the common antioxidants now available for use in rubber compositions as well as many of the common accelerators of vulcanization, softeners, oils and other common rubber compounding materials. In addition, reclaimed rubber which is frequently desirably used in many rubber compositions contains staining materials which are not readily identifiable.

In many cases it is neither feasible nor desirable to compound all the layers of a laminated article so that no migratory staining material is included in any of the layers since to do so would necessitate sacrificing certain physical properties imparted to the composition by such staining material. It is, therefore, an object of this invention to provide an article wherein light-colored compositions may be used in close proximity to compositions containing migratory staining material in a unitary construction and to provide means for preventing migration of the staining material into the light-colored composition. Other objects will be apparent from the description which follows.

We have discovered that the foregoing objects may be attained by a construction in which a buffer layer impervious to migratory staining materials is interposed between the light-colored layer and the layer containing staining material, the buffer layer comprising a rubbery copolymer of a major proportion by weight of an isoolefin having from 4 to 7 carbon atoms with a minor proportion by weight of an open-chain conjugated diolefin having from 4 to 8 carbon atoms, which rubbery material may be used either alone or in combination with a rubber compatible therewith.

This invention may be embodied in any laminated article and is particularly applicable for use in tire casings having a carcass desirably containing migratory staining material and having white sidewall portions normally subject to staining. The invention will be described in detail with reference to a tire casing for purposes of illustration but it will be understood that the invention may be embodied in any laminated article.

A tire construction embodying this invention is illustrated in the accompanying drawing in which the single figure is a fragmentary sectional perspective view showing a portion of the tire embodying this invention, the sidewall portion being stripped back for clarity of illustration.

The tire construction illustrated in the accompanying drawing includes the usual bead portions 10, 10, carcass portion 11 comprising a plurality of plies of rubberized cord fabric, sidewall portions 12, 12 and tread portion 13 which extends down over the shoulders of the tire to join the sidewall portion. The sidewall portions 12, 12 which may be 0.01–0.5" thick or thicker and are preferably 0.1" thick, are formed of a white rubber composition subject to staining and the carcass portion 11 comprises a rubber composition including one or more migratory materials which normally would migrate into and stain the white sidewall. Such migration and staining is prevented, however, by interposing buffer layers 14, 14 between the sidewall portions 12, 12 and the respective underlying zones of the carcass portion 11, the buffer layer comprising a rubber composition in which from 40 to 100% of the rubber consists of a rubbery copolymer of a major proportion of an isoolefin having from 4 to 7 carbon atoms with a minor proportion of an open-chain conjugated diolefin having from 4 to 8 carbon atoms and the remainder of the rubber comprises a rubber which is compatible with the above rubbery copolymer in the proportion specified.

The particular rubbery copolymer used as a barrier material is desirably a rubbery copolymer of a major proportion, i. e., over 50% by weight of isobutlyene with a minor proportion of isoprene. Preferably the copolymer consists of from 70 or 80 to 99½ parts by weight of an isomonoolefin such as isobutylene or ethyl methyl ethylene copolymerized with from ½ to 20 or 30 parts by weight of an open-chain conjugated diolefin such as isoprene; butadiene-1,3; piperylene; 2,3-dimethyl butadiene-1,3; 1,2-dimethyl butadiene-1,3 (or 3-methyl pentadiene-1,3); 1,3-dimethyl butadiene-1,3; 1-ethyl butadiene-1,3 (or hexanediene-1,3); 1,4-dimethyl butadiene-1,3 (or hexadiene-2,4); the copolymerization being effected by the usual method of copolymerizing such monomers as disclosed in detail in U. S. Patents Nos. 2,356,128, 2,356,129 and 2,356,130 to Thomas and Sparks. Typical examples of these synthetic rubbers are known to the trade as "GR-I," "Butyl A," "Butyl B," "Butyl C" and "Flexon." For purposes of brevity the barrier rubber will hereinafter be referred to as "Butyl" rubber.

The "Butyl" rubber effectively checks migration of staining materials when used as a buffer layer in amounts ranging from 40 to 100% by weight of the rubber in the buffer composition and blocks migration almost completely when used in amounts of from 70 to 100% by weight of the rubber in the buffer. Quantities of "Butyl" rubber below 40% may be used with some degree of success but usually permit too much migration for practical purposes. The buffer layer itself may contain staining materials in addition to the usual compounding materials including vulcanization agents such as sulfur, fillers, reinforcing materials, vulcanization accelerators, antioxidants, etc., in accordance with known techniques of rubber compounding. The "Butyl" rubber must be present in an amount equal to at least 10% by weight of the total composition used for the buffer layer and preferably in amounts of 20% by weight or higher. The buffer layer may be applied as a cement or in the form of a calendered strip and may be used in a layer as thin as 0.005" thick and preferably in a layer 0.035" thick although layers up to 0.1" thick or thicker may be used.

The "Butyl" rubber may be used alone as a buffer layer but is preferably used in conjunction with one or more other rubbery materials to promote adhesion between the buffer layer and the adjacent layers. The rubber used in conjunction with the "Butyl" rubber must of course be compatible with the "Butyl" rubber in amounts up to 1½ times the weight of "Butyl" rubber or higher. For this purpose, either natural rubber or neoprene or both are preferably used. The neoprene includes any rubbery polymer of a chlorobutadiene-1,3, such as 2-chlorobutadiene-1,3 or 2,3-dichlorobutadiene-1,3 or a copolymer of such a chlorobutadiene-1,3 with a lesser amount of a monomer copolymerizable therewith such as isoprene, styrene, acrylonitrile or butadiene-1,3. Typical examples of these rubbery materials are known to the trade as "Neoprene E," "Neoprene G," "Neoprene GN," "Neoprene KN," "Neoprene I," "Neoprene Z," "Neoprene MR," "GR-M" and "GR-M-10." Butadiene-acrylonitrile copolymers or butadiene-styrene copolymers may also be used particularly if used in conjunction with natural rubber or neoprene.

Prior to this invention the choice of compounding ingredients was seriously limited; but in practicing this invention, the carcass portion of the tire may be of any desired composition and preferably contains a substantial proportion of reclaimed rubber as well as the usual vulcanizing agents and accelerators therefor, reinforcing materials, fillers, softeners, antioxidants, etc. The composition of the rubber in the tread and bead portions is immaterial insofar as the present invention is concerned since the area of contact between these portions and the white sidewall portion is so small that as a practical matter no problem of migration and staining is produced. The tire embodying this invention is built up from its constituent parts and vulcanized in the usual manner by which the several parts are integrally united into a unitary structure. A cement, as for example a vulcanizable cement comprising "Butyl" rubber dissolved in a solvent therefor, may be used between the buffer layer and the adjacent layer to promote adhesion if desired; or a buffer layer which has been partially vulcanized prior to incorporation in the tire may be used.

Typical examples of compositions which may be used for the carcass, sidewall, and buffer layers will be described but it will be understood that such recipes are merely illustrative and are not intended to limit the scope of this invention and that the materials specified may be substituted and/or supplemented by various other materials and that all such materials may be employed in widely varying proportions in accordance with usual rubber compounding practice and as defined in the appended claims.

*White sidewall rubber composition*

| Materials: | Parts by weight |
|---|---|
| Crude natural rubber | 100.0 |
| Stearic acid | 2.0 |
| Paraffin | 0.75 |
| Zinc oxide | 50.0 |
| Titanium dioxide | 20.0 |
| Precipitated calcium carbonate | 30.0 |
| Ultramarine blue | 0.15 |
| Sulfur | 3.0 |
| 2-Mercaptobenzothiazole | 1.0 |
| Zinc dimethyl dithiocarbamate | 0.05 |
| Total | 206.95 |

*Carcass composition*

| Materials: | Parts by weight |
|---|---|
| Crude natural rubber | 40.0 |
| Butadiene-styrene rubber (75:25 copolymer) | 40.0 |
| Reclaimed rubber (whole tire) | 40.0 |
| Zinc oxide | 3.0 |
| Carbon black | 30.0 |
| Stearic acid | 1.0 |
| Light mineral oil | 5.0 |
| Pine tar | 5.0 |
| Sulfur | 3.0 |
| Phenylbetanaphthylamine | 1.5 |
| Tetramethylthiuram disulfide | .8 |
| Total | 168.3 |

*Buffer layer composition*

| Materials: | Parts by weight |
|---|---|
| "Butyl" rubber (80:20 copolymer of isobutylene and isoprene) | 100.0 |
| Fatty acid | 1.0 |
| Carbon black | 60.0 |
| Zinc oxide | 5.0 |
| Sulfur | 2.0 |
| 2-Mercaptobenzothiazole | 0.5 |
| Tetramethylthiuram disulfide | 1.0 |
| Total | 169.5 |

The carcass composition is calendered on a suitable cord fabric preferably of the weftless type and a number of layers of the resulting rubberized fabric are plyed together to form a tire carcass. Thin strips of the buffer composition are positioned on the respective sides of the carcass portion. The white sidewall composition is extruded into suitably shaped strips which are superimposed on the buffer layer. A conventional rubber tread member is placed over the crown of the carcass extending downwardly over the shoulders of the tire to abut the white sidewall portion. The assembled tire is then vulcanized at 275° F. for 30 minutes to yield a unitary structure. The vulcanizing cycle may, of course, be varied and the vulcanization may be effected within the range of 250°-310° F. or higher for 15 to 60 minutes.

This invention is applicable to any laminated article comprising a layer of a light-colored rubber composition in combination with a layer of a rubber composition containing migratory staining material. The composition of the buffer layer may be varied widely in accordance with usual compounding technique so long as the rubber present includes at least 40 to 100% by weight "Butyl" rubber as defined heretofore.

Further variations and modifications may be effected within the spirit and scope of the invention as defined in the appended claims.

We claim:

1. An unvulcanized vulcanizable article comprising opposed layers of rubber compositions normally pervious to migratory staining material and a buffer layer disposed between said opposed layers comprising a rubbery copolymer of 70 to 99½ parts by weight of an isoolefin having from 4 to 7 carbon atoms with ½ to 30 parts by weight of an open-chain conjugated diolefin having from 4 to 8 carbon atoms, each said composition containing a vulcanizing agent therefor, all said layers being adhered together.

2. An unvulcanized vulcanizable article comprising a body of a light-colored composition normally subject to staining containing a rubber pervious to migratory staining material, a body disposed closely adjacent to said first-named body comprising a migratory staining material and a rubber pervious to said material, and a buffer layer of a composition impervious to said staining material interposed between said bodies and joined thereto, said buffer layer comprising a rubbery copolymer of 80 to 99½ parts by weight of an isoolefin having from 4 to 7 carbon atoms with ½ to 20 parts by weight of an open-chain conjugated diolefin having from 4 to 8 carbon atoms, each of said bodies and the buffer layer containing a vulcanizing agent therefor.

3. A laminated article of manufacture comprising inner and outer layers of vulcanized rubber compositions normally pervious to migratory staining material and a buffer layer of a composition impervious to said staining material interposed between said inner and outer layers and integrally united therewith, said buffer layer comprising a rubbery copolymer of 80 to 99½ parts by weight of an isoolefin having from 4 to 7 carbon atoms with ½ to 20 parts by weight of an open-chain conjugated diolefin having from 4 to 8 carbon atoms.

4. A unitary article of manufacture including a body of a light-colored composition normally subject to staining comprising a vulcanized rubber pervious to migratory staining materials, a body disposed closely adjacent to said first-named body comprising a migratory staining material and a vulcanized rubber pervious to said staining material, and a buffer layer of a composition impervious to said staining material interposed between said bodies and joined thereto, said buffer layer comprising a vulcanized rubbery copolymer of 80 to 99½ parts by weight of an isoolefin having from 4 to 7 carbon atoms with ½ to 20 parts by weight of an open-chain conjugated diolefin having from 4 to 8 carbon atoms.

5. A unitary vulcanized article of manufacture including a body of a light-colored composition normally subject to staining comprising a rubber pervious to migratory staining material, a second body disposed closely adjacent said first-named body comprising a migratory staining material and a rubber pervious to said material, and a buffer layer of a composition impervious to said staining material interposed between said bodies, said buffer layer comprising a rubbery copolymer of from 80 to 99½ parts by weight of isobutylene with from ½ to 20 parts by weight of isoprene, said layer and bodies all being adhered together.

6. An article of manufacture including a light-colored composition normally subject to staining and comprising a vulcanized rubber pervious to migratory staining material, a second composition disposed closely adjacent said first-named composition and comprising a migratory staining material and a vulcanized rubber pervious to said material, and a buffer layer of a composition impervious to said staining material interposed between said compositions and joined thereto, said buffer layer comprising a rubber composition in which from 40 to 100% by weight of the rubber consists of a rubbery copolymer of 80 to 99½ parts by weight of an isoolefin having from 4 to 7 carbon atoms with ½ to 20 parts by weight of an open-chain conjugated diolefin having from 4 to 8 carbon atoms and the remainder of the rubber consists of a rubber compatible with said rubbery copolymer present in an amount up to 1½ times the weight of said copolymer.

7. A tire casing comprising a light-colored sidewall portion normally subject to staining, a carcass portion which comprises a rubber pervious to migratory staining material containing a migratory staining material, and a buffer layer interposed between said sidewall and carcass portions, said buffer layer comprising a rubbery copolymer of 80 to 99½ parts by weight of an isoolefin having from 4 to 7 carbon atoms with ½ to 20 parts by weight of an open-chain conjugated diolefin having from 4 to 8 carbon atoms, said buffer layer, sidewall, and carcass all being adhered together.

8. A tire casing comprising a light-colored sidewall portion normally subject to staining, a carcass portion which comprises a rubber pervious to migratory staining material containing a migratory staining material, and a buffer layer interposed between said sidewall and carcass portions, said buffer layer comprising a rubbery copolymer of from 80 to 99½ parts by weight of isobutylene with from ½ to 20 parts by weight of isoprene, said buffer layer, sidewall, and carcass all being bonded together.

9. A tire casing comprising a light-colored sidewall portion normally subject to staining, a carcass portion which comprises a rubber pervious to migratory staining containing a migratory staining material, and a buffer layer interposed between said sidewall and carcass portions, said buffer layer comprising a rubbery composition in which from 40 to 100% by weight of the rubber consists of a rubbery copolymer of 80 to 99½ parts by weight of an isoolefin having from 4 to 7 carbon atoms with ½ to 20 parts by weight of an open-chain conjugated diolefin having from 4 to 8 carbon atoms and the remainder of the rubber consists of a rubber compatible with said rubbery copolymer present in an amount up to 1½ times the weight of said copolymer, said buffer layer, sidewall, and carcass all being bonded together.

10. The article of claim 6 in which the remainder of said rubber consists of crude rubber.

11. The article of claim 6 in which from 70 to 100% by weight of the rubber in said buffer layer consists of said rubbery copolymer.

12. The tire casing of claim 9 in which the remainder of said rubber consists of crude rubber.

13. The tire casing of claim 9 in which from 70 to 100% by weight of the rubber in said buffer layer consists of said rubbery copolymer.

14. The article of claim 6 in which said copolymer is a rubbery copolymer of 80 to 99½ parts by weight of isobutylene with ½ to 20 parts by weight of isoprene and in which the remainder of said rubber consists of crude rubber.

15. The tire casing of claim 9 in which said copolymer is a rubbery copolymer of 80 to 99½ parts by weight of isobutylene with ½ to 20 parts by weight of isoprene and in which the remainder of said rubber consists of crude rubber.

GEORGE C. HESSNEY.
JOHN W. MARTINDALE.

REFERENCES CITED

The following references are of record in the file of this patent:

UNITED STATES PATENTS

| Number | Name | Date |
| --- | --- | --- |
| 2,240,856 | Phillips | May 6, 1941 |
| 2,313,945 | Kellog et al. | Mar. 16, 1943 |
| 2,381,739 | Gray | Aug. 7, 1945 |

FOREIGN PATENTS

| Number | Country | Date |
| --- | --- | --- |
| 112,875 | Australia | Apr. 7, 1941 |